US 6,914,984 B2

(12) United States Patent
Lim (10) Patent No.: US 6,914,984 B2
(45) Date of Patent: Jul. 5, 2005

(54) ENCRYPTION APPARATUS USING DATA ENCRYPTION STANDARD ALGORITHM

(75) Inventor: Young-Won Lim, Ichon-shi (KR)

(73) Assignee: HYNIX Semiconductor, Inc., Ichon-shi (KR)

( * ) Notice: Subject to any disclaimer, the term of this patent is extended or adjusted under 35 U.S.C. 154(b) by 792 days.

(21) Appl. No.: 09/874,377

(22) Filed: Jun. 6, 2001

(65) Prior Publication Data

US 2002/0003876 A1 Jan. 10, 2002

(30) Foreign Application Priority Data

Jun. 8, 2000 (KR) ........................................ 2000-31247

(51) Int. Cl.[7] ................................................ H04L 9/34
(52) U.S. Cl. ...................................................... 380/29
(58) Field of Search ........................... 380/28, 37, 259, 380/29

(56) References Cited

U.S. PATENT DOCUMENTS 6,347,143 B1 * 2/2002 Goff et al. .................... 380/37

OTHER PUBLICATIONS

Hardware Design and Performance Estimation of □□The 128–bit Block Cipher CRYPTON □□□□Eunjong Hong, Jai–Hoon Chung, and Chae Hoon Lim □□.*

Efficient 8–Cycle DES Implementation □□Young Won Lim.*

* cited by examiner

Primary Examiner—Gregory Morse
Assistant Examiner—Andrew L Nalven
(74) Attorney, Agent, or Firm—Pillsbury Winthrop Shaw Pittman LLP (57) ABSTRACT

An encryption device eliminates data contention and minimizes area by accessing twice data for a given time by using a memory device of two times faster access time. The encryption device for performing encryption of plain text blocks using data encryption standard algorithm, wherein the encryption device includes an initial permutation unit, a data encryption unit having n-stage (n is an even number) pipeline structure using a first clock, a second clock and a third clock, and an inverse initial permutation unit, the encryption device includes: a multiplexer for selecting one of n/3 48-bit inputs; 8 S-Boxes, each for receiving 6-bit address among the selected 48-bit and outputting 4-bit data; a demultiplexer for distributing 32-bit data from the S-Boxes to n/3 outputs; and a controller for control the multiplexer and the demultiplexer with a fourth clock and a fifth clock, wherein the fourth and the fifth clock are faster than the first, the second and the third clocks by n/3 times.

3 Claims, 8 Drawing Sheets

ENCRYPTION APPARATUS USING DATA ENCRYPTION STANDARD ALGORITHM

FIELD OF THE INVENTION

The present invention relates to an encryption apparatus, and, more particularly, to an encryption apparatus using data encryption standard algorithm.

PRIOR ART OF THE INVENTION

Generally, DES (Data Encryption Standard) algorithm is one of the most widely used encryption schemes. As usage of networking increases, the DES algorithm becomes a matter of concern. In particular, in area of a security Internet application, a remote access server, a cable modem and modem for satellites, this algorithm is widely used.

The DES algorithm is a 64-bit block cipher which basically have a 64-bit block input and a 64-bit block output, 56 bits among key block of the 64 bits being used for encryption and decryption and remaining 8 bits being used for parity checking. Using the DES algorithm, an encryption apparatus receives a 64-bit plain text and a 56-bit key and outputs a 64-bit cipher text.

As techniques for implementing the DES algorithm, there are permutation (P-Box), substitution (S-Box), and key schedule for generating a subkey.

A data encryption unit performs iteration of 16 rounds and includes an initial permutation (IP) of an input unit and an inverse IP ($IP^{-1}$) of an output unit.

Figure 1:
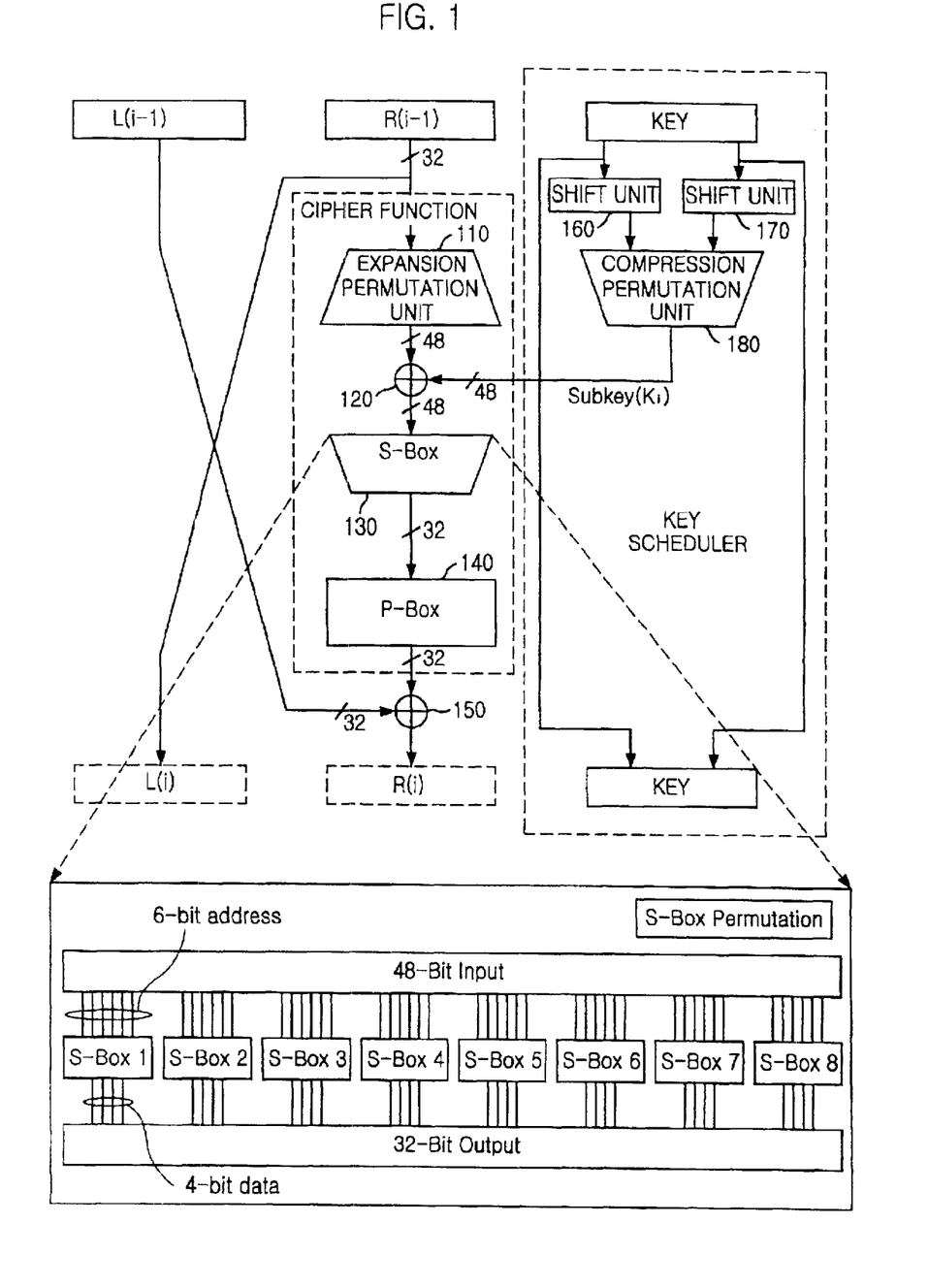
FIG. 1 shows a cipher function of a typical DES architecture and a detailed diagram of a S-Box permutation unit.

FIG. 1 shows a cipher function of the typical DES architecture and a detailed diagram of a S-Box permutation unit.

Referring to FIG. 1, the cipher function f includes an expansion permutation unit 110, an exclusive-OR (XOR) unit 120, an S-Box permutation unit 130, a P-Box permutation unit 140 and an XOR unit 150.

The expansion permutation unit 110 performs expansion permutation over 32-bit data ($R_{(i-1)}$) from a right register registering 32-bit text block to output 48-bit data.

The XOR unit 120 performs XOR operation over the 48-bit data from the expansion permutation unit 110 and a sub-key ($K_i$) from a key scheduler.

The S-Box permutation unit 130 performs substitution over 48-bit data from the XOR unit 120 to output 32-bit data.

The P-Box permutation unit 140 performs permutation over 32-bit data from the S-Box permutation unit 130.

The XOR unit 150 performs XOR operation over 32-bit data from the P-Box permutation unit 140 and 32-bit data ($L_{(i-1)}$) from a left register.

The key scheduler includes two shift units 160, 170, each for receiving and shifting corresponding one of two 28-bit blocks from the 56-bit key, and a compression permutation unit 180 for permuting by compressing two blocks from the shift units 160, 170 into a subkey.

Particularly, the S-Box permutation unit 130 includes 8 S-Boxes, each for receiving a 6-bit input and generating a 4-bit output. That is, the 48-bit data is divided into 8 6-bit data and each of the divided data is applied to the corresponding S-Box. Each of the S-Boxes outputs 4-bit data and, therefore, the 48-bit data is converted to the 32-bit data. The S-Box permutation unit 130 may be implemented by a look-up scheme, which requires a storage such as a PLA (Programmable Logic Array) and a ROM (Read Only Memory) Since the 4-bit data is outputted for the 6-bit data, each S-Box requires 64×4 storage capability. As there are 8 S-Boxes, 8×64×4 storages are required totally. Therefore, the S-Boxes occupies relatively large area within a chip.

Figure 2:
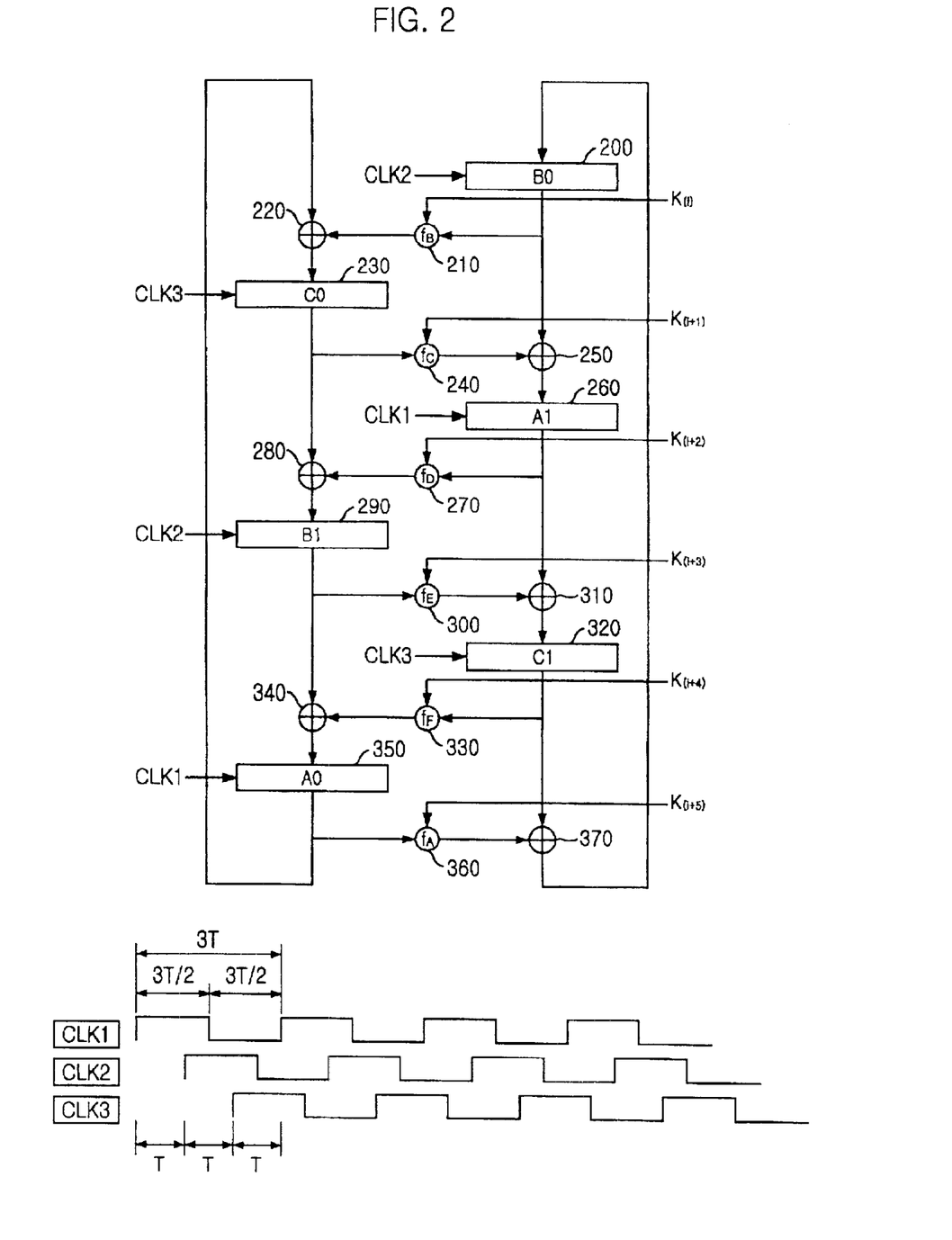
FIG. 2 shows a block diagram illustrating DES architecture of 6-stage pipeline structure using a three-phase clock which has an effect of improvement for processing capability and is applied to the present invention.

FIG. 2 is a block diagram of a DES architecture having 6-stage pipeline structure using a three-phase clock, which has an effect on processing capability and is applied to an embodiment of the present invention.

Referring to FIG. 2, the DES algorithm of the present invention, at first, divides the 64-bit plain text block from an initial permutation unit into two 32-bit blocks and then stores $a_0$ and $b_0$, at a first left register A0 350 by using a first clock and at a first right register B0 200 by using a second clock, respectively.

Then, after receiving the subkey $K_{(i)}$ generated from the key scheduler, the 32-bit data from the first right register B0 200 is modified by encrypting by the cipher function f 210. then the modified data is XOR-operated with the 32-bit data of the first left register A0 350, which is modified by the cipher function f, at the XOR unit 220. Also, the 32-bit data at the XOR unit 220 is stored at a second left register C0 230 by using a third clock CLK3.

Then, after receiving the subkey $K_{(i+1)}$ generated from the key scheduler, the 32-bit data at the second left register C0 230 is modified by encrypting by the cipher function f 240 and, then, is XOR-operated with the modified 32-bit data of the first right register B0 200 at the XOR unit 250. Also, the 32-bit data at the XOR unit 250 is stored at a second right register A1 260 by using a first clock CLK1.

Then, after receiving the subkey $K_{(i+2)}$, the 32-bit data at the second right register A1 260 is modified by encrypting by the cipher function f 270 and, then, is XOR-operated with the modified 32-bit data of the second left register C0 230 at the XOR unit 280. Also, the 32-bit data at the XOR unit 280 is stored at a third left register B1 290 by using a second clock CLK2.

Then, after receiving the subkey $K_{(i+3)}$, the 32-bit data at the third left register B1 290 is modified by encrypting by the cipher function f 300 and, then, is XOR-operated with the modified 32-bit data of the second right register A1 260 at the XOR unit 310. Also, the 32-bit data at the XOR unit 310 is stored at a third right register C1 320 by using the third clock CLK3.

After receiving the subkey $K_{(i+4)}$, the 32-bit data at the third right register C1 320 is modified by encrypting by the cipher function f 330 and, then, is XOR-operated with the modified 32-bit data of the third left register B1 290 at the XOR unit 340. Also, the 32-bit data at the XOR unit 340 is stored at the first left register A0 350 by using the first clock CLK1.

After receiving the subkey $K_{(i+5)}$, the 32-bit data at the first left register A0 350 is modified by encrypting by the cipher function f 360 and, then, is XOR-operated with the modified 32-bit data of the third right register C1 320 at the XOR unit 370.

The 32-bit data of the third left register B1 290 of the final round is a block $b_{15}$ and the 32-bit data outputted from the XOR unit 310 of the final round is $b_{16}$.

The second clock CLK2 is a delayed version of the first clock CLK1 by ⅓ period and the third clock CLK3 is a delayed version of the second clock CLK2 by ⅓ period. At a rising edge of the first clock CLK1, new values are stored at the registers A0 and A1 and, at a rising edge of the second clock CLK2, new values are stored at the registers B0 and B1. At a rising edge of the third clock CLK3, new values are stored at the registers C0 and C1.

Figure 3:
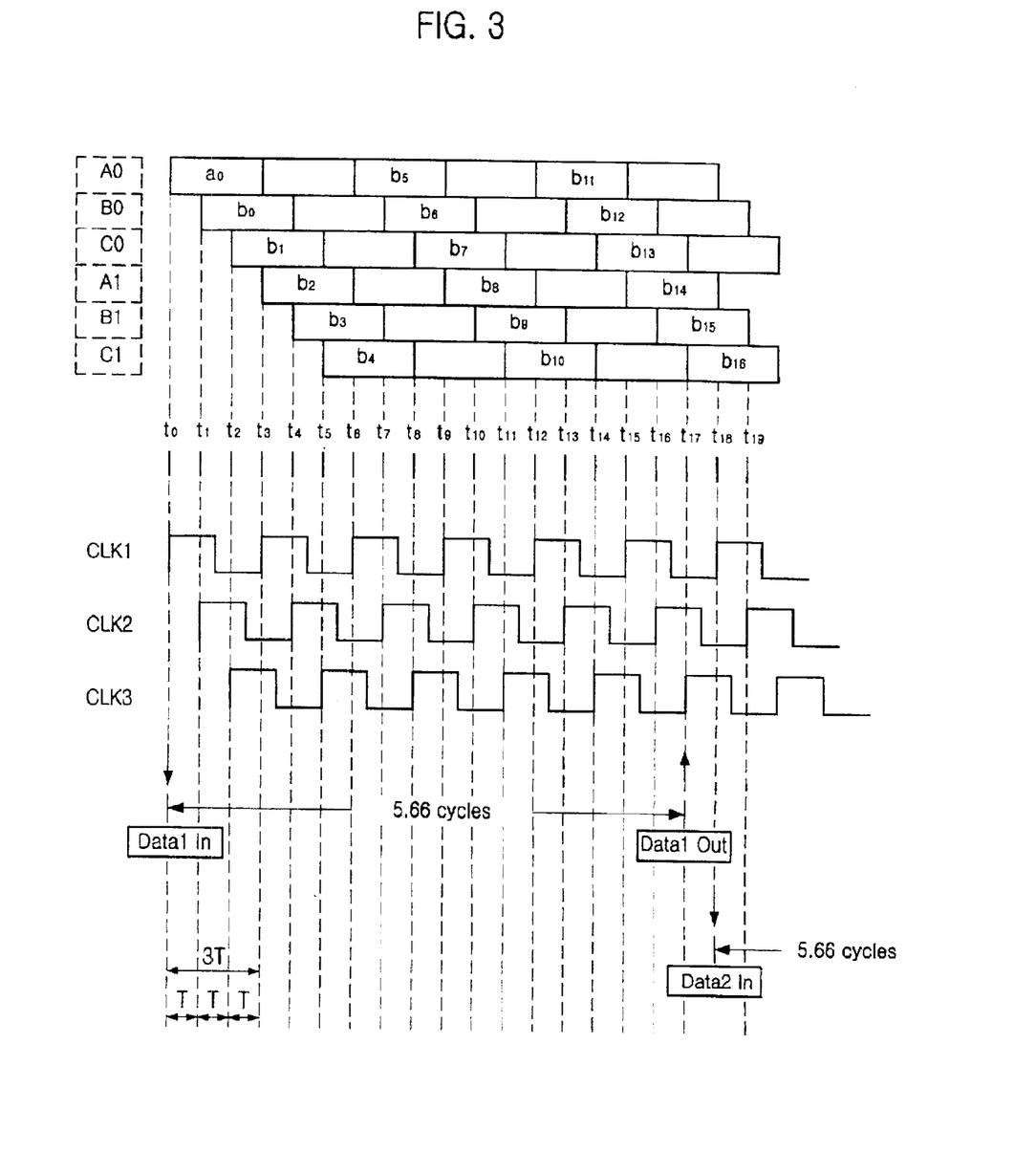
FIG. 3 is a timing diagram for explaining operation of the DES architecture having the 6-stage pipeline structure in FIG. 2.

FIG. 3 is a timing diagram for explaining operation of the DES architecture having the 6-stage pipeline structure in FIG. 2.

Referring to FIG. 3, the 64-bit plain text after the initial permutation is divided into the two 32-bit blocks $a_0$ and $b_0$. The values of the $a_0$ and $b_0$ are stored at the registers A0 by the first clock CLK1 at timing $t_0$ and the registers B0 by the second clock CLK2 at timing $t_1$, respectively. Calculation of the value of the $b_1(b_1=a_0 \oplus f(b_0, K_1))$ is started at $t_1$ and the calculation result is stored at the register C0 at $t_2$. At this time, the $a_0$ that applied to the register A0 is remained to $t_3$ and, thereby, it can be used to calculate $b_1$ during a period $t_1-t_2$, and the $b_1$ is remained till $t_5$ and, thereby, it can be used to calculate $b_2$ during a period $t_2-t_3$. This can be solved because the registers A0, B0 and C0 store new values by the first clock CLK1, the second clock CLK2 and the third clock CLK3, which are delayed from each other. The value of $b_2(b_2=b_0 \oplus f(b_1, K_2))$ is calculated during the period $t_2-t_3$ and stored at the register A1 by the second CLK1 at $t_3$. As described above, by enabling simultaneous access to the registers by using the clock of three-phase, time for which the values of $b_1, b_2, \ldots, b_{16}$ are calculated can be reduced to 5.66 clock cycles.

Generally, a number of 64-bit plain text or cipher text, which is to be encrypted or decrypted for a given key, can be inputted consecutively. For example, since an encryption scheme that is used in a MCNS cable modem performs encryption in unit of a MAC frame, 1,518 bytes of the plain text at maximum should be encrypted with an identical key. That is, for a number of plain text, 16-round DES core is to be calculated by using a key. In this case, processing capability can be improved by using the pipeline structure of the conventional technique.

Figure 4:
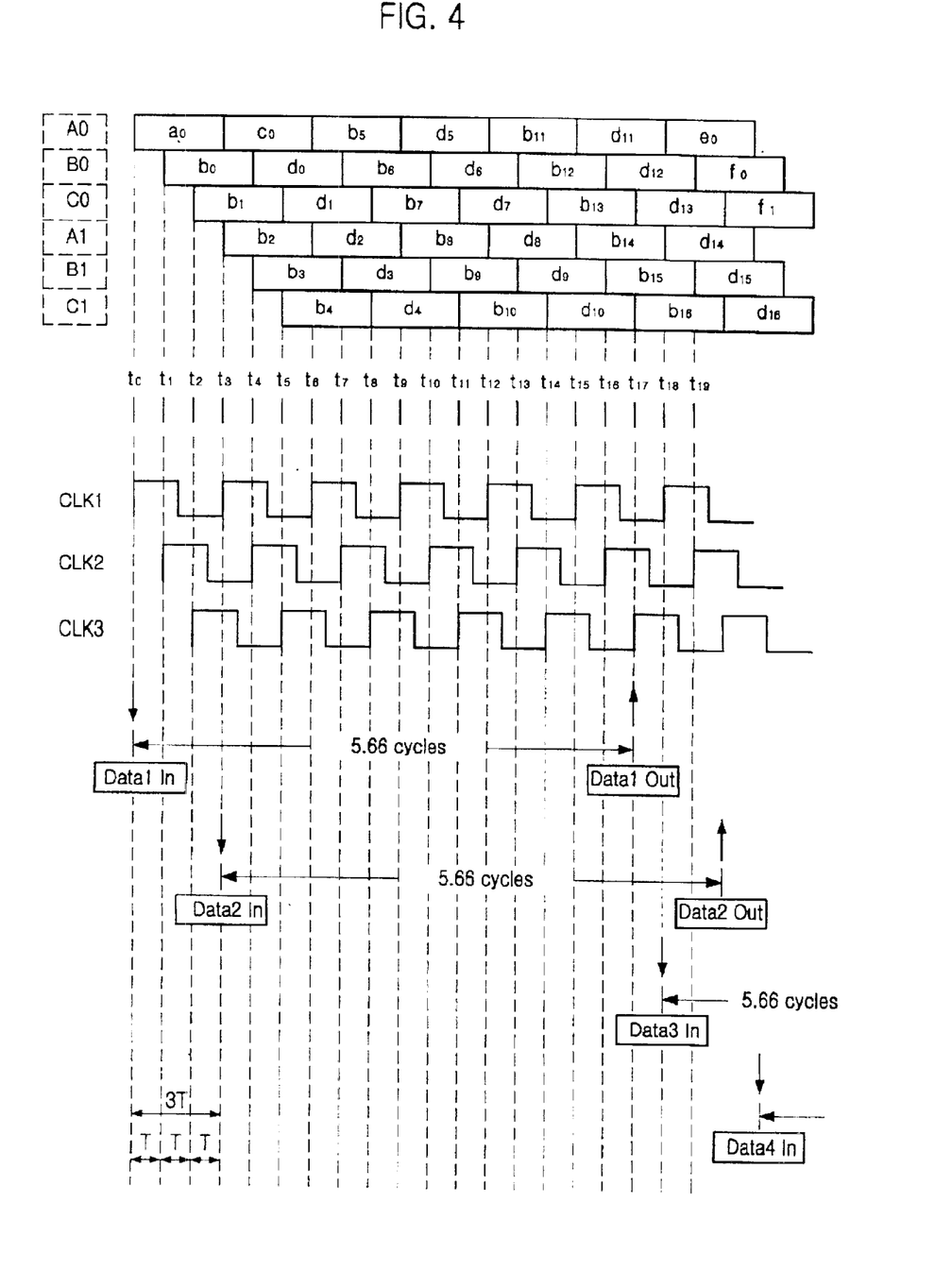
FIG. 4 is a timing diagram for explaining operation of the pipeline of the DES architecture of the 6-stage pipeline structure in FIG. 2.

FIG. 4 is a timing diagram for explaining operation of the pipeline of the DES architecture of the 6-stage pipeline structure in FIG. 2.

Referring to FIG. 4, the timing diagram for pipeline operation proves that two plain text blocks can be simultaneously processed for 5.66 clock cycles by using the pipeline structure. Also, by applying new plain text blocks $c_0$ and $d_0$ to the registers A0 and B0 at $t_3$ and $t_4$, during an empty portion of FIG. 3, values of the new plain text blocks, $d_i$ can be calculated during calculation of the values $b_i$. At this time, at every period of $t_0-t_1, t_1-t_2, t_2-t_3, \ldots$, to encrypt the new plain text blocks $b_i$ and $d_i$, two cipher functions f are executed simultaneously. The number of the plain text that can be processed for 5.66 clock cycles is increased by two times. However, this case leads need to additionally implement S-Boxes constituting the cipher function one by one.

The cipher function f requires S-Box permutation unit that is implemented by using a ROM or a programmable logic array (PLA).

Figure 5:
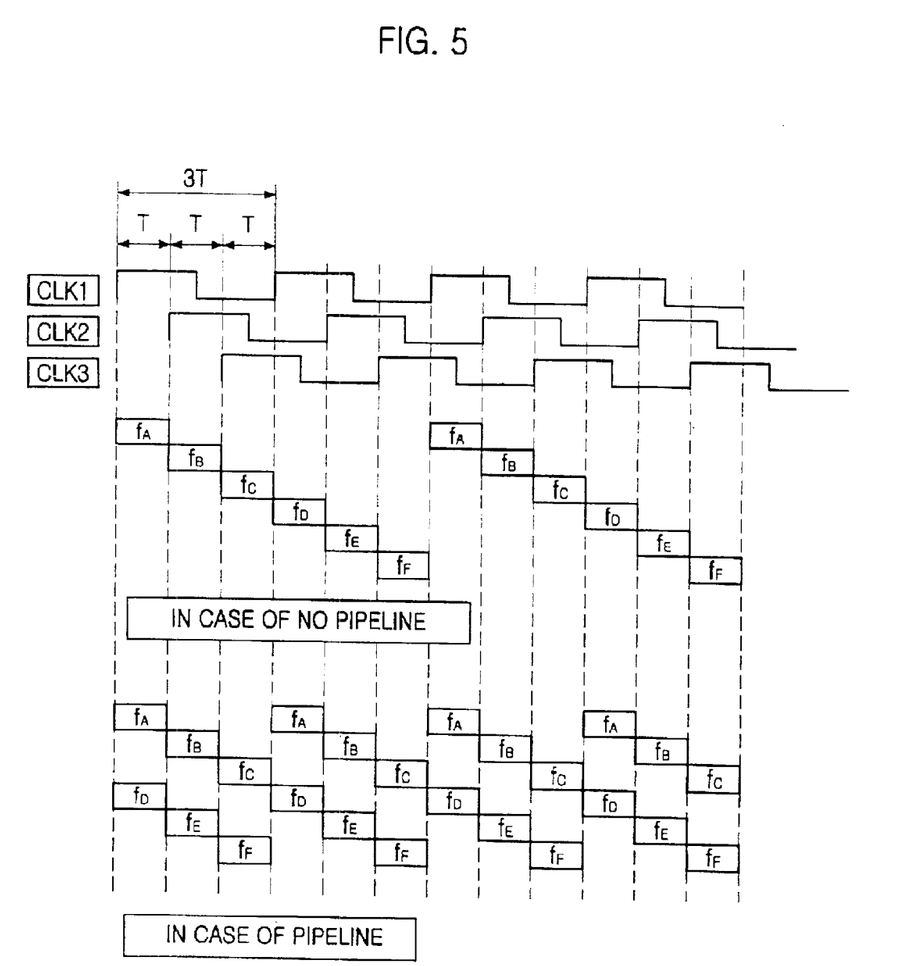
FIG. 5 is an operation sequence diagram for the cipher function when the DES architecture pipeline of the 6-stage pipeline structure in FIG. 2 is not used and when the pipeline is used.

FIG. 5 is an operation sequence diagram for the cipher function when the DES architecture pipeline of the 6-stage pipeline structure in FIG. 2 is not used and when the pipeline is used.

Referring to FIG. 5, in a case that a 64-bit plain text block is encrypted, i.e., when the pipeline is not used, six cipher functions $f_A, f_B, f_C, f_D, f_E, f_F$ in FIG. 2 are calculated in time division by the three-phase clock and, therefore, can be implemented by only one S-Box permutation unit. However, in case that the two 64-bit plain text are encrypted simultaneously with the pipeline, two groups of the cipher functions $(f_A, f_B, f_C)$ and $(f_D, f_E, f_F)$ are timely divided but three groups of the cipher functions $(f_A, f_B), (f_C, f_D)$ and $(f_E, f_F)$ are calculated simultaneously without time division so that two S-Box permutation units are required.

Figure 6:
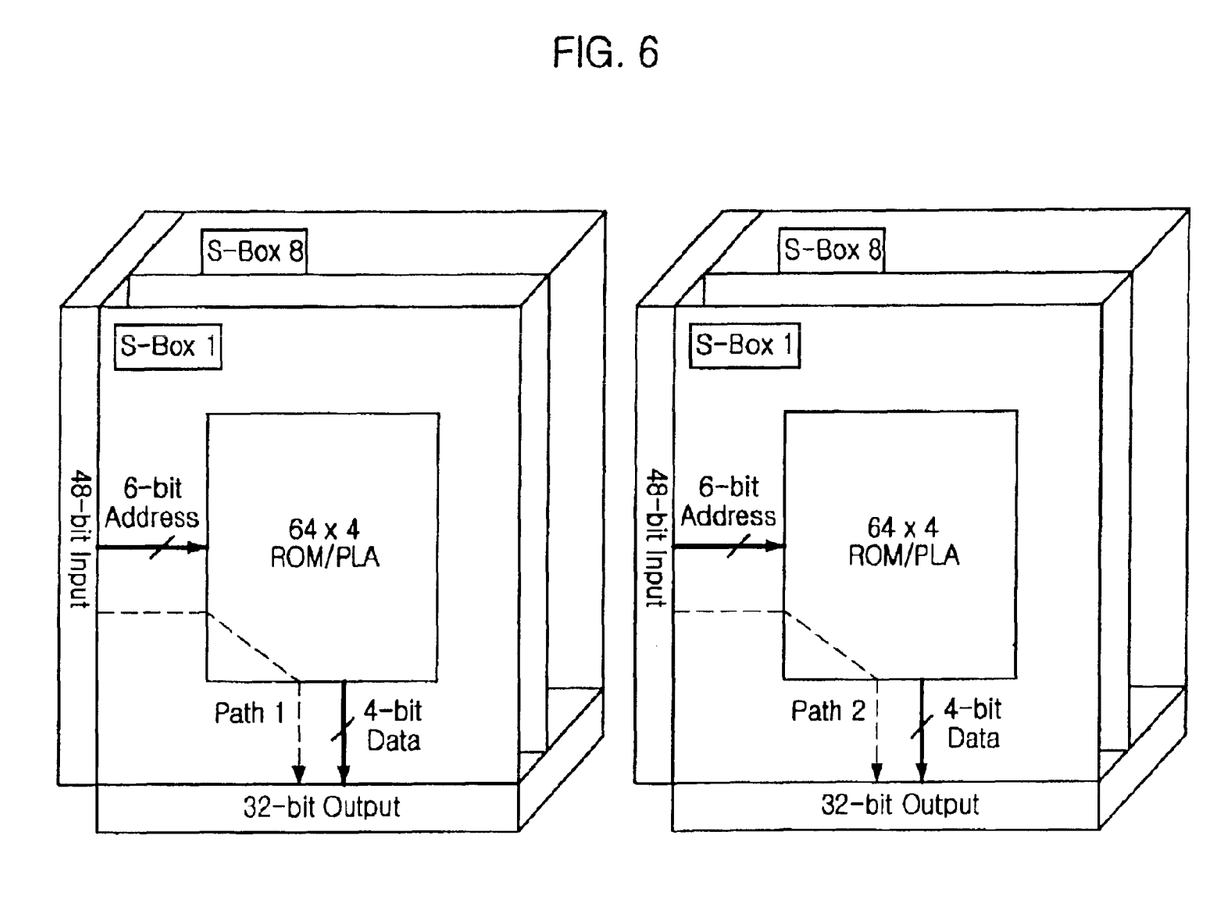
FIG. 6 illustrates a detailed block diagram of a conventional single port S-Box permutation unit.

FIG. 6 illustrates a detailed block diagram of a conventional single port S-Box permutation unit.

Referring to FIG. 6, conventionally, two S-Box permutation units are used to perform pipeline operation and each of the S-Box permutation units include 8 S-Boxes, receives 48-bit input data and outputs 32-bit output data. Each S-Box is configured by 64×4 ROMs or PLAs and has a first path receiving 6-bit address and outputting 4-bit data. In the two S-Box permutation units, there are a first path and a second path, which are physically separated from each other.

Conventionally, the problem of data contention, i.e., a requirement for simultaneous access to the memory devices for implementing the S-Box permutation units, is solved with the two physically separated paths as described above. Therefore, usage of two identical S-Boxes leads increase of resultant area.

SUMMARY OF THE INVENTION

Therefore, it is an object of the present invention to provide an encryption apparatus for eliminating data contention and minimizing an area In accordance with an aspect of the present invention, there is provided an encryption apparatus for performing encryption of plain text blocks using data encryption standard algorithm, wherein the encryption device includes an initial permutation unit, a data encryption unit having n-stage (n is an even number) pipeline structure using a first clock, a second clock and a third clock, and an inverse initial permutation unit, the encryption device comprising: a multiplexer for selecting one of n/3 48-bit inputs; 8 S-Boxes, each for receiving 6-bit address among the selected 48-bit and outputting 4-bit data; a demultiplexer for distributing 32-bit data from the S-Boxes to n/3 outputs; and a controller for control the multiplexer and the demultiplexer with a fourth clock and a fifth clock, wherein the fourth and the fifth clock are faster than the first, the second and the third clocks by n/3 times.

BRIEF DESCRIPTION OF THE DRAWINGS

The above and other objects and features of the instant invention will become apparent from the following description of preferred embodiments taken in conjunction with the accompanying drawings, in which.

PREFERRED EMBODIMENT OF THE INVENTION

Hereinafter, preferred embodiments of the present invention will be described in detail with reference to the accompanying drawings.

Figure 7:
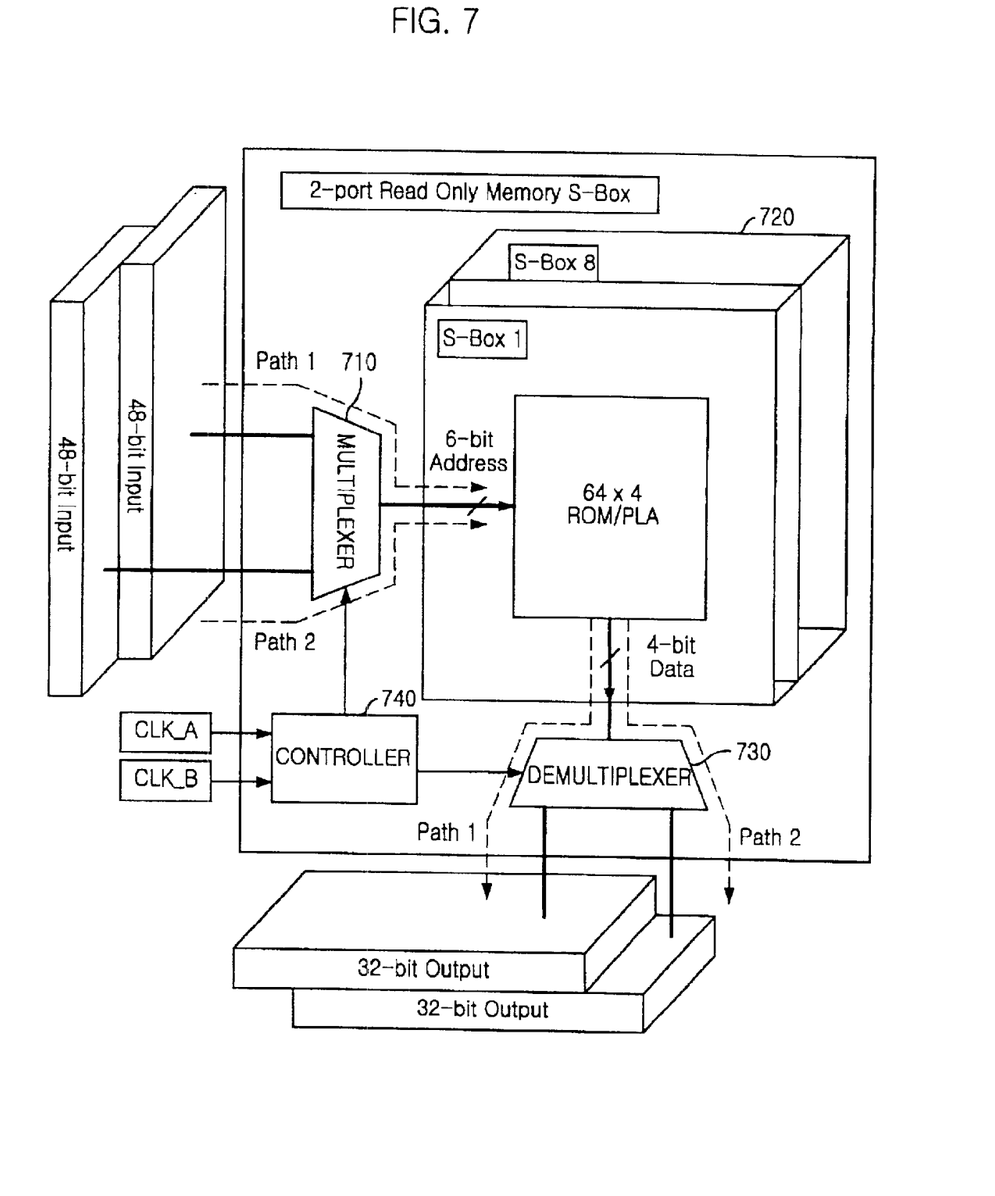
FIG. 7 represents a detailed block diagram of configuration of a 2-port S-Box permutation unit in accordance with the present invention.

FIG. 7 represents a detailed block diagram of configuration of a 2-port S-Box permutation unit in accordance with the present invention.

Referring to FIG. 7, the S-Box permutation unit of the present invention includes a multiplexer 710 for selecting one of two 48-bit data that are inputted under control of a controller 740, 8 S-Boxes 720 for receiving 8 6-bit addresses from the multiplexer 710 and outputting 8 4-bit data, a demultiplexer 730 for distributing the 4-bit data to two outputs under control of the controller; and the controller 740 receiving a first clock CLK_A and a second clock CLK_B for controlling the multiplexer and the demultiplexer.

Figure 8:
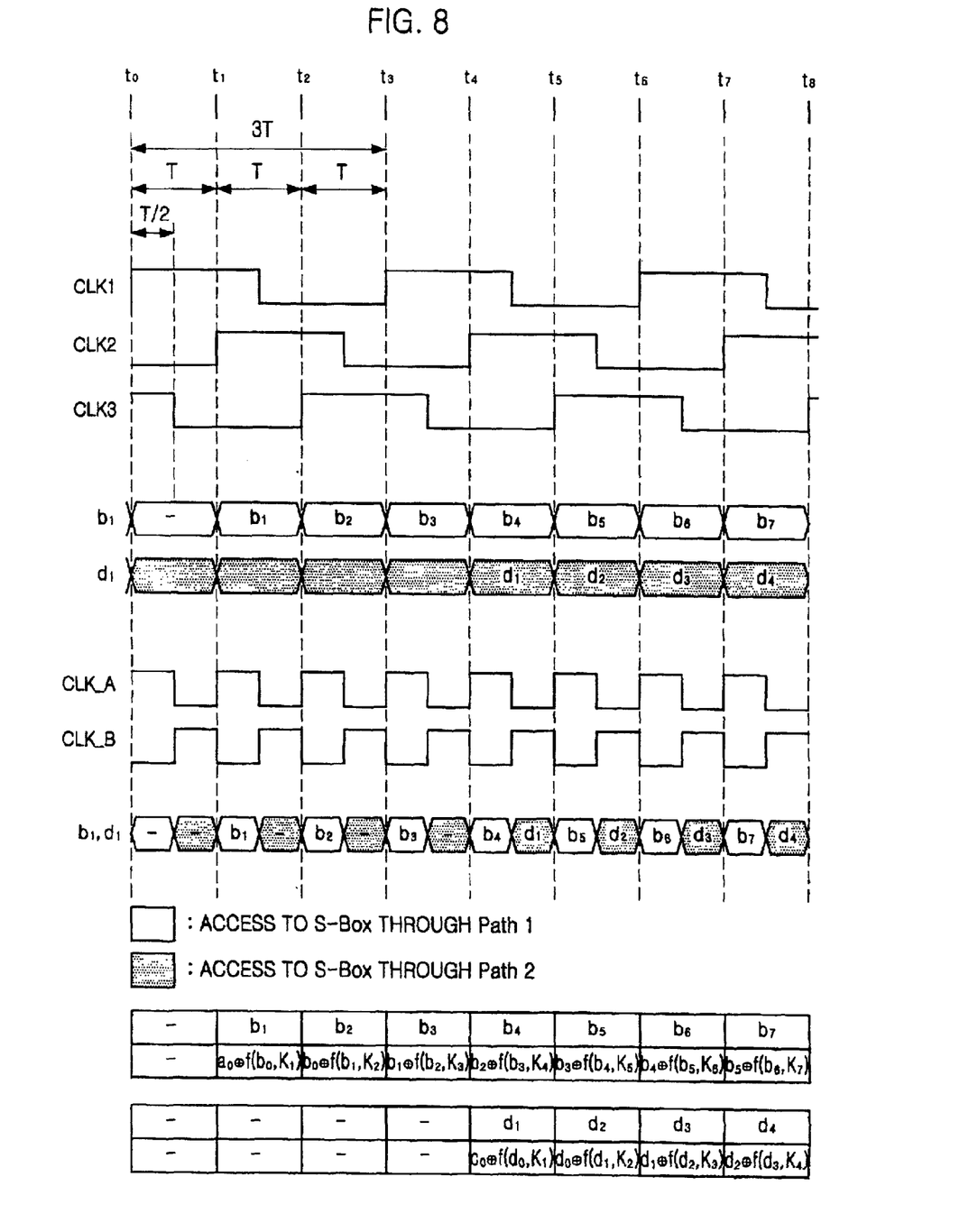
FIG. 8 offers a timing diagram for operation of the conventional single port S-Box permutation unit and the 2-port S-box permutation unit in accordance with the present invention.

FIG. 8 offers a timing diagram for explaining operation of the conventional single port S-Box permutation unit and the 2-port S-box permutation unit in accordance with the present invention.

Referring to FIG. 8, the present invention generates signals that are required for ROM access by using the first clock CLK_A and the second clock CLK_B, which are two times faster and applied to the controller. During each time period $t_i$–$t_{i+i}$, there conceptually provided a first path (path1) and a second path (path2), which are timely divided, by the multiplexer for selecting one the first path (path1) and the second path (path2). Therefore, data contention problem can be eliminated.

That is, values $b_i$ are calculated by selecting the first path when the first clock CLK_A is at logic high and values $d_i$ are calculated by selecting the second path when the second clock CLK_B is at logic high.

As described above, the encryption apparatus in accordance the present invention uses only one S-Box at a time so as to reduce area occupied by the S-Box permutation unit to its half. Therefore, the present invention can efficiently, i.e., cost effectively, configure circuits so that the number of net dies increases with smaller chip area.

While the present invention has been shown and described with respect to the particular embodiments, it will be apparent to those skilled in the art that many changes and modifications may be made without departing from the spirit and scope of the invention as defined in the appended claims.

What is claimed is:

1. An encryption apparatus for performing encryption of plain text blocks using data encryption standard algorithm, wherein the encryption apparatus includes an initial permutation unit, a data encryption unit having n-stage (n is an even number) pipeline structure using a first clock, a second clock and a third clock, and an inverse initial permutation unit, wherein the improvement comprises:

a multiplexer for selecting one of n/3 48-bit inputs;

8 S-Boxes, each for receiving 6-bit address among the selected 48-bit and outputting 4-bit data;

a demultiplexer for distributing 32-bit data from the S-Boxes to n/3 outputs; and a controller to control the multiplexer and the demultiplexer with a fourth clock and a fifth clock, wherein the fourth and the fifth clock are faster than the first, the second and the third clocks by n/3 times.

2. The encryption apparatus as recited in claim 1, wherein the fourth clock is an inverse signal of the fifth clock.

3. The encryption apparatus as recited in claim 2, wherein the multiplexer and the demultiplexer perform time division between n/3 input paths and between n/3 output paths, respectively, to thereby avoid data collision.

\* \* \* \* \*